United States Patent [19]

Okada et al.

[11] Patent Number: 5,350,438
[45] Date of Patent: Sep. 27, 1994

[54] METHOD AND APPARATUS FOR REMOVING PLATED METAL FROM STEEL SHEET SCRAPS

[75] Inventors: Yuji Okada, Toyota; Shunichi Fujio, Aichi; Kazuhiro Suzuki; Teruharu Shinoyama, both of Toyota; Yasuo Takeuchi, Nishikamo, all of Japan

[73] Assignees: Toyota Jidosha Kabushiki Kaisha; Toyokin Kabushiki Kaisha, both of Toyota, Japan

[21] Appl. No.: 155,810

[22] Filed: Nov. 23, 1993

Related U.S. Application Data

[63] Continuation-in-part of Ser. No. 058,034, May 7, 1993, abandoned, which is a continuation of Ser. No. 886,934, May 22, 1992, abandoned.

[30] Foreign Application Priority Data

| May 23, 1991 | [JP] | Japan | 3-146636 |
| Nov. 26, 1991 | [JP] | Japan | 3-335584 |
| Nov. 26, 1991 | [JP] | Japan | 3-335585 |
| Nov. 26, 1991 | [JP] | Japan | 3-335586 |

[51] Int. Cl.$^5$ .............................................. C22B 7/00
[52] U.S. Cl. ........................................ 75/401; 75/403; 266/149; 266/901
[58] Field of Search .................. 75/401, 403; 266/149, 266/901

[56] References Cited

U.S. PATENT DOCUMENTS

| 3,476,372 | 11/1969 | Tezuka . |
| 3,529,067 | 9/1970 | Grott . |
| 3,762,911 | 10/1973 | Von der Crone et al. . |
| 4,227,922 | 10/1980 | Laws et al. . |
| 5,205,857 | 4/1993 | Yokoyama .......................... 75/401 |

FOREIGN PATENT DOCUMENTS

| 59-123731 | 7/1984 | Japan . |
| 60-253167 | 12/1985 | Japan . |
| 61-23858 | 6/1986 | Japan . |
| 63-96224 | 4/1988 | Japan . |
| 2-47058 | 10/1990 | Japan . |
| 4-35536 | 6/1992 | Japan . |
| 4-35537 | 6/1992 | Japan . |

OTHER PUBLICATIONS

75th. Steelmaking 51st. Ironmaking and 10th. Process Technology Division Conferences—Iron and Steel Society—April 5–8, 1992—Removal of zinc by Baking of Automotive Body Scrap—pages 264–267.

*Primary Examiner*—Melvyn J. Andrews

[57] ABSTRACT

Metal plated steel sheet scraps are heated to a temperature in the range of about 200° C.–500° C. so that organic material adhered to the scraps is evaporated and removed. Then, the scraps from which organic material has been removed are heated to a temperature in the range of about 500° C.–950° C. so that the plated metal, for example zinc or aluminum, is evaporated. The evaporated metal flows to a retrieving device where the evaporated metal is condensed and retrieved.

21 Claims, 8 Drawing Sheets

METHOD AND APPARATUS FOR REMOVING PLATED METAL FROM STEEL SHEET SCRAPS

The present application is a continuation in part application of U.S. patent application Ser. No. 08/058,034, filed May 7, 1993, which in turn is a continuation application of U.S. patent application Ser. No. 07/886,934, filed May 22, 1992, now abandoned.

BACKGROUND OF THE INVENTION

1. Field of the Invention

The present invention relates to a method and apparatus for removing plated metal, particularly from steel sheet scraps, for example, removing zinc from galvanized steel sheet scraps.

2. Description of the Prior Art

When using galvanized steel sheet scraps such as automobile scraps and press scraps for steel materials, it is desirable to remove the plated zinc from the galvanized steel sheet scraps, because zinc oxide shortens the life of a smelting furnace.

One example of a prior art method for removing zinc from galvanized steel sheets is disclosed in Japanese Patent Publication SHO 61-23858, though the galvanized steel sheets are not automobile steel sheet scraps. With that method, the galvanized steel sheets are heated in a furnace under reduced pressure to evaporate the plated metal and then the evaporated metal is retrieved with a collector.

However, if that prior art method is used to remove zinc from galvanized steel sheet scraps from automobiles, zinc can not be removed with great efficiency. This is because scraps brought from car shredders usually have machine oil and press oil adhered to the scraps and often contain resin parts. When such scraps are heated, the organic material evaporates to form layers of fireproofing compounds such as $ZnCl_2$, $ZnS$, and $ZnSO_4$ on the surfaces of the scraps, which suppresses the evaporation of zinc.

SUMMARY OF THE INVENTION

An object of the invention is to provide a method and apparatus for removing plated metal from steel sheet scraps wherein the plated metal can be removed with great efficiency, even if the scraps contain various kinds of organic material.

The above-described object is achieved with a method and apparatus for removing plated metal from steel sheet scraps in accordance with the present invention.

The method includes the steps of: preheating metal plated steel sheet scraps in a preheat chamber, heating the preheated scraps to a temperature in a range of about 200° C.–500° C. under reduced pressure in a pretreatment chamber to evaporate organic material adhered to the scraps and contained in the scraps, capturing the evaporated organic material, conveying the scraps through an intermediate chamber into a treatment chamber, heating the scraps to a temperature in a range of about 500° C.–950° C. and reducing a pressure in the treatment chamber to evaporate plated metal from the scraps, retrieving the evaporated metal, and cooling the scraps with gas in a cooling chamber.

The apparatus includes: a pretreatment chamber having heating means for heating metal plated steel sheet scraps to a temperature in the range of about 200° C.–500° C. to evaporate organic material adhered to and contained in the scraps, a pressure reducing pump connected to the pretreatment chamber via a passage, and a filter for capturing the evaporated organic material installed in the passage connecting the pretreatment chamber to the pressure reducing pump; and a treatment chamber having a heater for heating the remaining scraps to a temperature in the range of about 500° C.–900° C., a pressure reducing pump connected to the treatment chamber via a passage, and an evaporated metal retrieving device installed in the passage connecting the treatment chamber to the pressure reducing pump.

In the method and apparatus in accordance with the present invention, since the organic material is evaporated at a temperature below the boiling point of the plated metal and is removed before the plated metal is evaporated, the organic material does not react with the evaporated metal and formation of a compound on the surfaces of the steel sheet scraps is prevented. As a result, the plated metal can be smoothly evaporated to be almost perfectly and completely removed from the steel sheet scraps.

In this instance, if the scraps were heated to a temperature above 700° C. under atmospheric pressure, zinc would form a zinc oxide layer on the surfaces of the scraps to suppress the evaporation of zinc. Further, if the scraps were heated to a temperature above 1000° C. under atmospheric pressure, zinc would not evaporate but would scatter into the matrix of the steel and the steel itself would be oxidized. Thus, for the purpose of decreasing the oxygen concentration to prevent formation of zinc oxide and oxidation of the steel itself, the pressure in the pretreatment chamber and in the treatment chamber should be reduced.

The vapor pressure of zinc at 250° C. is $10^{-4}$ mmHg and the melting point of zinc is 419° C. Therefore, when the scraps are heated to a temperature above 250° C., removal of plated zinc is theoretically possible. From the viewpoint of plated metal removal efficiency, however, heating to a temperature above 400° C. is preferable. Further, from the view point of preventing interference with evaporation of organic material, it is preferable to heat the scraps to a temperature equal to or greater than 500° C. Zinc can be evaporated at temperatures as high as 1100° C. However, since zinc removal efficiency at 1100° C. is no greater than the efficiency at 950° C., the upper limit of 950° C. is provided for the purpose of saving power and suppressing operation costs.

BRIEF DESCRIPTION OF THE DRAWINGS

The above and other objects, features, and advantages of the present invention will become more apparent and will be more readily appreciated from the following detailed description of the preferred embodiments of the invention taken in conjunction with the accompanying drawings, in which.

DETAILED DESCRIPTION OF THE PREFERRED EMBODIMENTS

Figure 1:
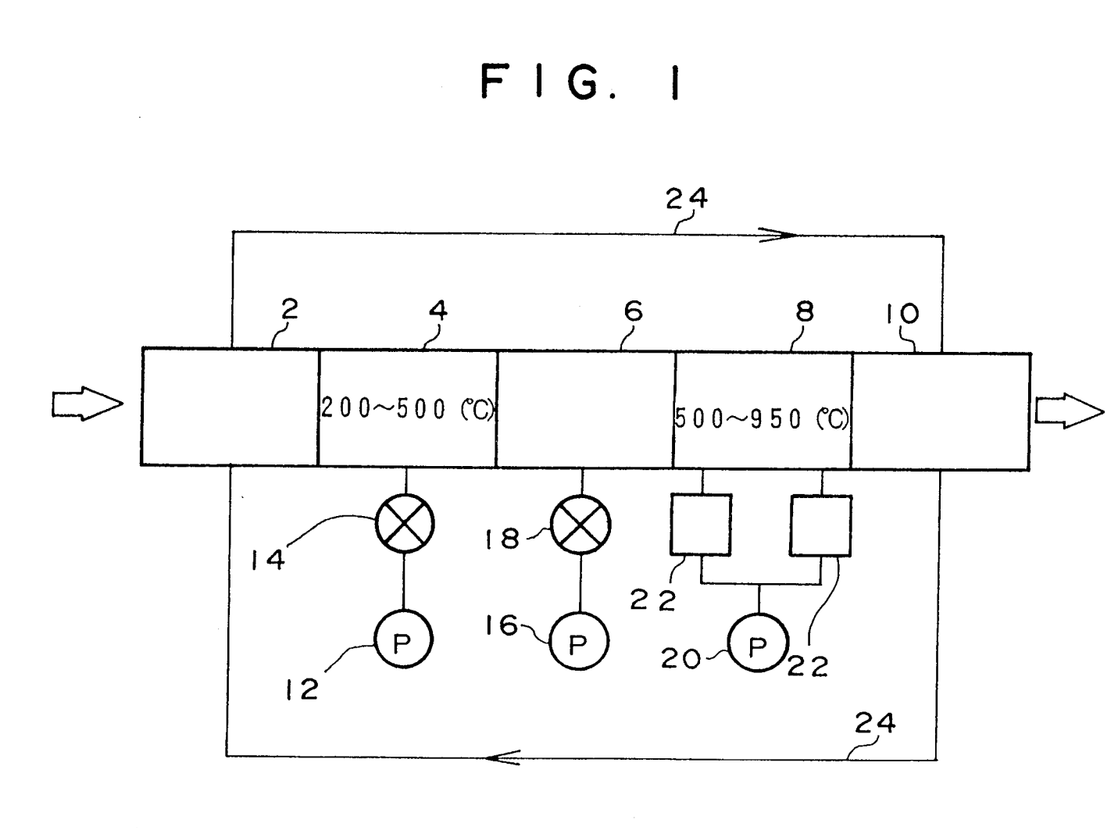
FIG. 1 is a schematic diagram with respect to arrangement of chambers and devices included in an apparatus for removing plated metal from steel sheet scraps in accordance with a first embodiment of the present invention.

FIG. 1 illustrates an apparatus for removing plated metal from steel sheet scraps, for example, galvanized steel sheet scraps in accordance with the first embodiment of the invention. The apparatus generally includes a preheat chamber 2, a pretreatment chamber 4, an intermediate chamber 6, a treatment chamber 8, and a cooling chamber 10, which are arranged in series in the order recited.

The preheat chamber 2 is a chamber for preheating metal plated steel sheet scraps (for example, galvanized steel sheet scraps). The preheat chamber 2 is filled with gas which may be air or non-oxidizing gas, for example, Ar gas. When non-oxidizing gas is used, oxidation of the scraps in the preheat chamber 2 is almost completely prevented. When air is used, the running cost is low, and oxidation of the scraps is suppressed because the gas in the preheat chamber 2 contains much $CO_2$ and CO. The preheat chamber 2 is maintained at an atmospheric pressure, so that the scraps can be raised in temperature in a shorter time period in the atmospheric pressure environment than in a vacuum pressure environment. The gas may be circulated from the cooling chamber for the purpose of saving energy. The same gas as that in the preheat chamber 2 fills the other chambers 4, 6, 8 and 10.

The pretreatment chamber 4 is a chamber for evaporating organic material which may be adhered to or may be contained in the scraps, to capture the evaporated organic material. The pretreatment chamber 4 has a heater capable of heating the scraps to a temperature in a range of 200° C.–500° C. A pressure reducing pump 12 is connected to the pretreatment chamber 4 via a passage to reduce the pressure of the pretreatment chamber 4 to, for example, a pressure in the range of $10^{-4}$ mmHg – $10^{-1}$ mmHg so that the organic material is not oxidized and can be evaporated at relatively low temperatures. A filter 14 for capturing the evaporated organic material is installed in the passage which connects the pretreatment chamber 4 to the pressure reducing pump 12.

The intermediate chamber 6 is arranged between the pretreatment chamber 4 and the treatment chamber 8. The intermediate chamber 6 functions to separate the treatment chamber 8 from the pretreatment chamber 4. The intermediate chamber 6 also functions to maintain the reduced pressure and the raised temperature while continuously conveying the scraps from the pretreatment chamber 4 to the treatment chamber 8. The intermediate chamber 6 may have a heater for heating the scraps, but such a heater can be omitted. A pressure reducing pump 16 is connected to the intermediate chamber 16 via a passage and a filter 18 is installed in the passage connecting the intermediate chamber 6 to the pressure reducing pump 16. Due to this system structure, the intermediate chamber 6 can operate to evaporate the organic material which may remain on the surfaces of the scraps and to capture the evaporated organic material, so that the organic material can be substantially perfectly removed from the scraps before the scraps are brought into the treatment chamber 8. Further, since the treatment chamber 8 is separated from the pretreatment chamber 4 from the intermediate chamber 6, evaporated zinc generated in the treatment chamber 8 is prevented from flowing into the pretreatment chamber 4 and condensing and attaching to the scraps in the pretreatment chamber 4.

Figure 2:
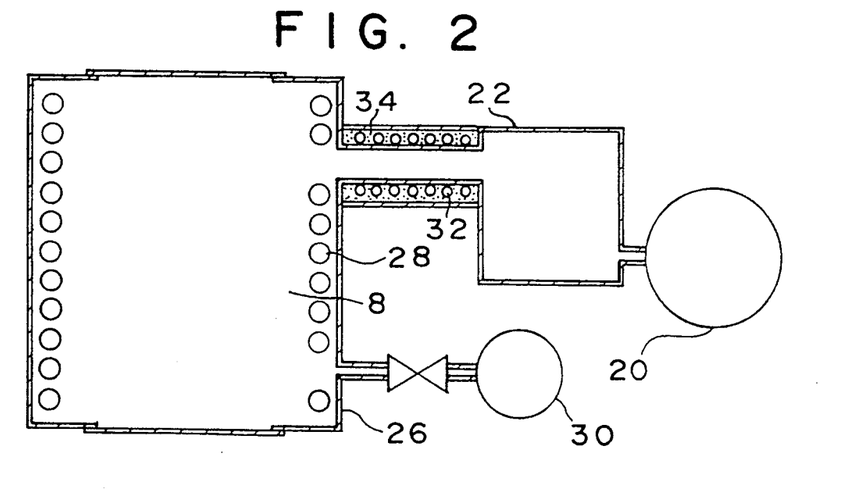
FIG. 2 is a cross-sectional view of a treatment chamber and a plated metal retrieving device of the apparatus of FIG. 1.

The treatment chamber 8 is a chamber for evaporating plated metal from the steel sheet scraps, for example, for evaporating zinc from galvanized steel sheet scraps, to capture the evaporated metal. FIG. 2 illustrates one example of such a treatment chamber 8, wherein the treatment chamber 8 has an air-tight container 26 and a heater 28 for heating the interior of the container 26. A pressure reducing pump 20 is connected to the treatment chamber 8 via a passage to reduce the pressure of the treatment chamber 8. A retrieving device or condenser 22 is installed in the passage connecting the treatment chamber 8 to the pressure reducing pump 20. A gas supply device for supplying air or non-oxidizing gas such as argon gas and nitrogen gas into the container 26 is connected to the treatment chamber 8. The supplied gas transmits heat from the heater 28 to the scraps through convection. Since the container 26 is filled with the gas when the scraps are heated and the container 26 is reduced in pressure when plating metal is evaporated, the pressure inside the container 26 changes at least one time between a pressure close to the atmospheric pressure and a pressure close to vacuum.

The reason why the retrieving device 22 is disposed between the treatment chamber 8 and the pressure reducing pump 20 is to prevent evaporated metal from condensing and attaching to the pressure reducing pump 20. Further, as shown in FIG. 2, the pipe which forms the passage connecting the treatment chamber 8 to the retrieving device 22 is provided with a heater 32 and a heat insulator to prevent evaporated metal from condensing on an inside surface of the pipe and closing the passage therethrough.

Figure 3:
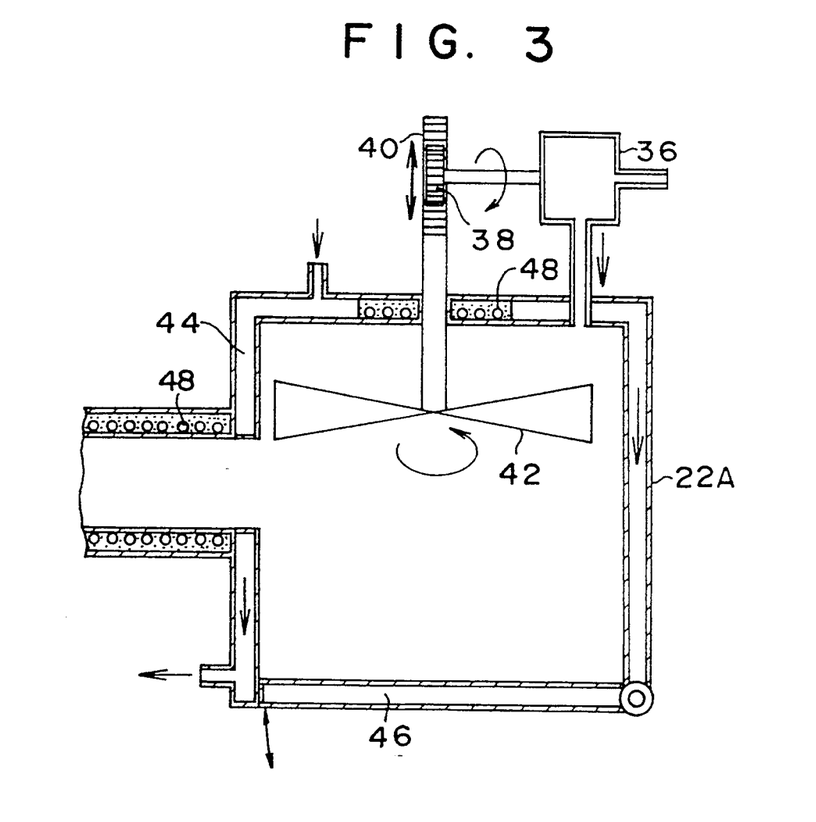
FIG. 3 is a cross-sectional view of a cutter-type retrieving device available to the retrieving device of FIG. 2.
Figure 4:
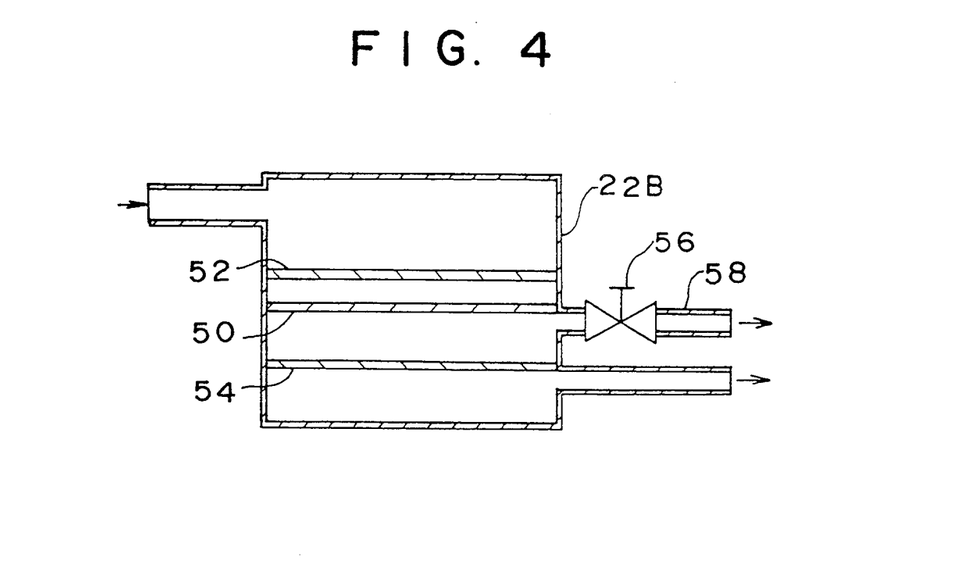
FIG. 4 is a cross-sectional view of a filter-type retrieving device available to the retrieving device of FIG. 2.
Figure 5:
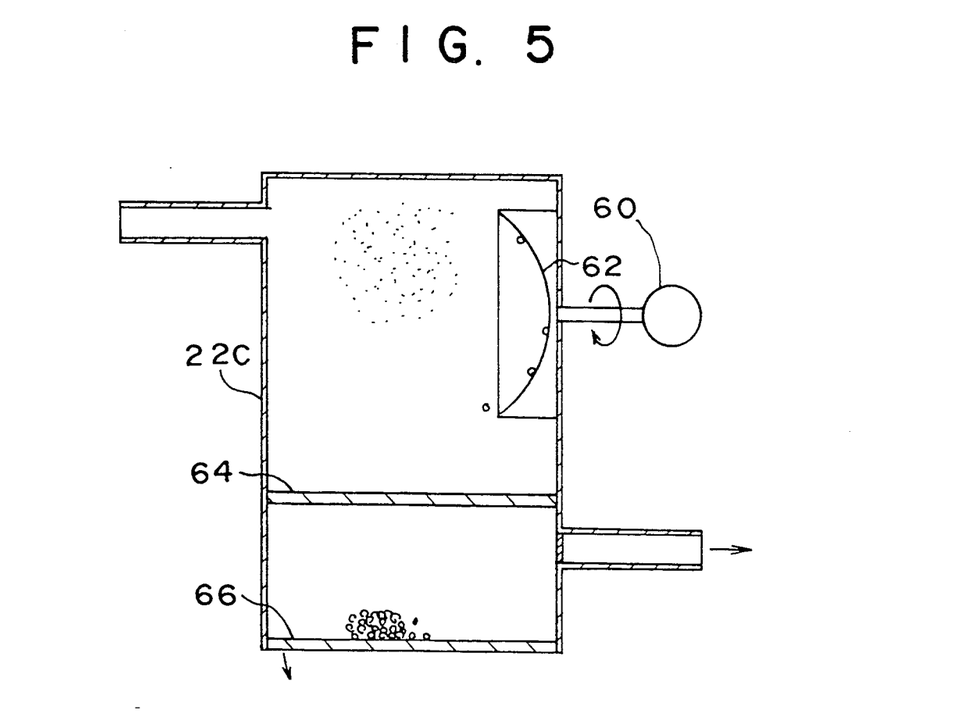
FIG. 5 is a cross-sectional view of a rapid cooling-type retrieving device available to the retrieving device of FIG. 2.

Various types of retrieving devices 22A, 22B, and 22C are illustrated FIGS. 3–5, respectively.

FIG. 3 illustrates a cutter-type retrieving device 22A, wherein a gear 38 is rotated by a motor 36 to move a rack 40 and a rotatable cutter 42 in a vertical direction so that the metal which attaches to the wall surface of the retrieving device 22A is cut down. The wall 44 is cooled by cooling water so that evaporated metal can smoothly condense at the wall surface. Then, a door 46 is opened and the cut-down metal is removed from the retrieving device 22A. An inlet portion of the retrieving device 22A and a support portion for supporting the rotatable cutter shaft are heated by a heater 48 so that evaporated metal does not condense on those portions.

FIG. 4 illustrates a filter-type retrieving device 22B, wherein a filter 50 which is cooled is disposed in the container so that evaporated metal is captured by the filter 50. Doors 52 and 54 are disposed on front and rear sides of the filter 50 so that pressure can be adjusted when the filter 50 is replaced. For the purpose of making the pressure adjustment easy, a pressure adjusting valve 56 and a bypass 58 are provided.

FIG. 5 illustrates a rapid cooling-type retrieving device 22C. In that device, a rotatable, rapid cooling member 62 which is rotated by a motor 60 is disposed in a container so that evaporated metal is brought into contact with the member 60 to be condensed in the form of amorphous and to be collected. The thus retrieved zinc has a purity higher than 98%. As a result, not only recycling of steel but also retrieving of plated metal is available.

The cooling chamber 10 is a chamber for cooling the steel sheet scraps conveyed from the treatment chamber 8 in air or non-oxidizing gas. Before the scraps are conveyed from the treatment chamber 8 into the cooling chamber 10, the cooling chamber 10 is depressurized to the same pressure as that of the treatment chamber 8 so that a door provided between the treatment 8 and the cooling chamber 10 can open without receiving a large pressure force. After the scraps is brought into the cooling chamber 10, the door is closed and then cooling gas (air or non-oxidizing gas) is introduced into the cooling chamber 10 to thereby raise the pressure in the cooling chamber 10 to an atmospheric pressure. When the gas flows into the cooling chamber 10, the gas effectively cools the scraps in the cooling chamber 10. As a result of cooling the scraps, the temperature of the cooling gas itself rises. In case where the gas is circulated to the preheat chamber 2 via circulation passage 24, the thermal energy retrieved from the heated scraps is effectively utilized.

A method for removing plated metal from steel sheet scraps in accordance with the first embodiment of the invention, which is executed using the above-described apparatus, will now be explained.

As a first step, metal plated steel sheet scraps (for example, galvanized steel sheet scraps) are placed in the preheat chamber 2 and are heated in the high temperature (for example, about 480° C.) air or non-oxidizing gas (for example, argon gas) at the atmospheric pressure. The gas may be circulated through the circulation passage 2 in order to save thermal energy.

As a second step, the scraps are placed in the pretreatment chamber 4 and are heated to a temperature in the range of about 200° C.–500° C. under reduced pressure More particularly, the heater of the pretreatment chamber 4 is mintained "ON" and the pressure of the pretreatment chamber 4 is at an atmospheric pressure when the scraps are brought into the pretreatment chamber 4. Then, the pressure of the pretreatment chamber 4 is reduced to a pressure in the range of $10^{-1}$–$10^{-4}$ mmHg. The temperature to which the scraps are heated is determined taking into consideration the various kinds of organic material adhered to and contained in the scraps. As a result of the heating process, the organic materials are evaporated without being oxidized. Then, the evaporated organic material is captured by a filter 14.

Because the organic material is removed, the plated metal will not react with the organic material to form $ZnCl_2$, $ZnS$, and $ZnSO_4$ when the plated metal is evaporated in the treatment chamber 8, and therefore, the plated metal can be smoothly evaporated. Further, as a result of the capture of the organic material with the filter 14, the evaporated organic material does not scatter. Therefore, the working environment in the factory is improved. In that regard, generally speaking, when steel sheet scraps are used for casting materials, the scraps will degrade the working environment if oil is adhered to the scraps. Conventionally, adhering oil is removed with acetone or by burning. However, oil removal with acetone will be accompanied by cost increase and oil removal by heating will cause oxidation of a portion of the scraps. However, by heating the scraps to 300° C. under $10^{-1}$ mmHg, substantially all oil adhered to the scraps can be evaporated without being oxidized.

As a third step, the scraps from which the organic material has been removed are placed in the intermediate chamber 6. The scraps may continue to be heated under reduced pressure, so that any remaining organic material is substantially removed from the scraps. The scraps may not be heated in the intermediate chamber 6 when the scraps are conveyed through the intermediate chamber 6. Also, the intermediate chamber 6 provides continuity between the pretreatment (removal of organic material) and the main treatment (removal of plated metal). Since the pretreatment and the main treatment are performed under reduced pressure, it is desirable to convey the scraps from the pretreatment chamber to the treatment chamber while maintaining the reduced pressure, which is made possible by providing the intermediate chamber 6. Further, since the intermediate chamber 6 separates the treatment chamber 8 from the pretreatment chamber 4, evaporated metal generated in the treatment chamber 8 is prevented from flowing into the pretreatment chamber 4 and condensing on the scraps in the pretreatment chamber 4.

As a fourth step, the scraps are placed in the treatment chamber 8 and are heated to a temperature in the range of about 500° C.–950° C. under reduced pressure so that the plated metal on the galvanized steel sheet scraps will effectively be evaporated. The heater of the treatment chamber 8 is maintained "ON" and the reduced pressure of the treatment chamber 8 is maintained when and after the scraps are brought into the treatment chamber 8. The evaporated metal is directed to the retrieving device 22 to be condensed and collected. More particularly, the scraps are placed in the container 26. The heater 28 is operated to heat the gas so as to heat the scraps. The pressure inside the container is then reduced by the pump 20 to a pressure in the range of $10^{-1} - 10^{-4}$ mmHg so that the plated metal will be evaporated.

In this instance, since the organic material has been removed before evaporation of the plated metal the zinc is evaporated without reacting with the organic material. The evaporated metal is retrieved by the retrieving device 22 so as to be condensed to solid metal and collected. Since metal is retrieved through evaporation, the retrieved metal has a high purity and can be used again.

As a fifth step, the steel sheet scraps from which the metal plating has been removed are placed in the cooling chamber 10 and are cooled by gas (air or non-oxidizing gas). After the scraps are cooled, the scraps are taken out of the cooling chamber 10 and are used for smelting materials. Since such materials are substantially free from zinc, the smelting furnace(s) will not be damaged. The cooling gas, which is raised in temperature as a result of cooling the scraps, may be circulated to the preheat chamber 2 so that electric power for preheating is saved, as noted above.

The essential steps among the above-described five steps are the second step (organic material removing step) and the fourth step (plated metal removing step).

Although zinc has been characterized as a metal plating which may be removed in accordance with the invention, in addition or in the alternative, aluminum plating can be removed, because aluminum has a boiling point close to that of a zinc. Therefore, the present invention can be used for removing aluminum from aluminum-plated steel sheet scraps. More particularly, when the above-described method is applied to aluminum-plated steel sheet scraps by heating the scraps to 900° C. under $10^{-4}$ mmHg, the plated aluminum can be almost perfectly removed. In that regard, the boiling point of aluminum at 10 mmHg is about 800° C.

For the purpose of confirming the plated metal removal effect in accordance with the invention, the following tests 1 to 4 were conducted using galvanized steel sheets. Both surfaces of used steel sheets were plated with zinc at a rate of 60 g/m² and the weight percent of zinc to steel sheets was about 2%.

TEST 1

Galvanized steel sheets were heated to 300° C.-1000° C. under $10^{-4}$ mmHg. Heating speed was 15° C./min and the temperature was held for about ten minutes. The test results are shown in FIG. 6.

Figure 6:
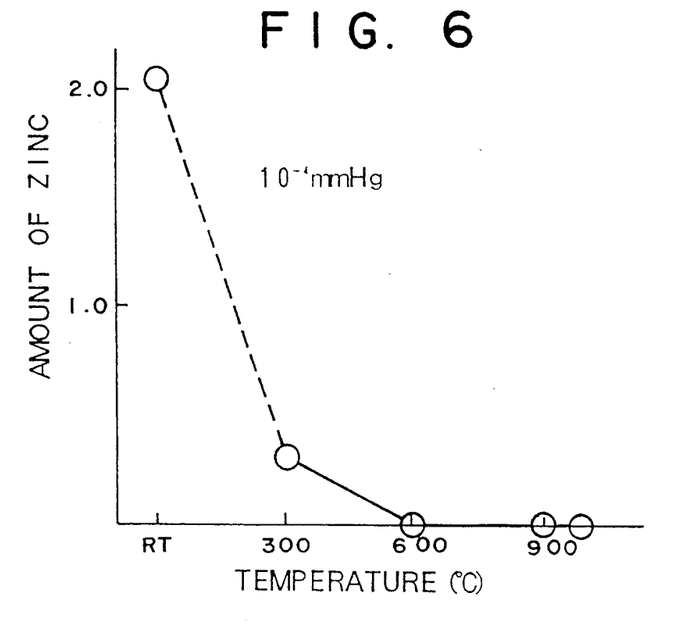
FIG. 6 is a graphical representation illustrating a remaining zinc amount versus temperature characteristic in accordance with the first embodiment of the present invention.

As can be seen in FIG. 6, the remaining zinc in the case of 600° C. (a zinc removal temperature in accordance with the present invention) was 0.029% while the remaining zinc in the case of 300° C. was 0.26%. Therefore, a conspicuous zinc removal effect is seen in accordance with the present invention. Further, the remaining zinc in the case of 900° C. was 0.002%, while the remaining zinc in the case of 1000° C. was 0.007%. The difference in the test results between the cases of 900° C. and 1000° C. are apparently due to measurement error.

TEST 2

Galvanized steel sheets were heated to 750° C. and 900° C. at the heating speed of 20° C./min under $10^{-1}$ mmHg and were maintained at those temperatures for about ten minutes. Then, amount of zinc adhered to the steel sheets was 0.01% for both 750° C. and 900° C. Further, the retrieved plated metal included 95% zinc and 5% zinc oxide. Therefore, a high purity of zinc was retrieved. In that regard, the purity of zinc in accordance with the conventional method is about 80%.

TEST 3

Figure 7:
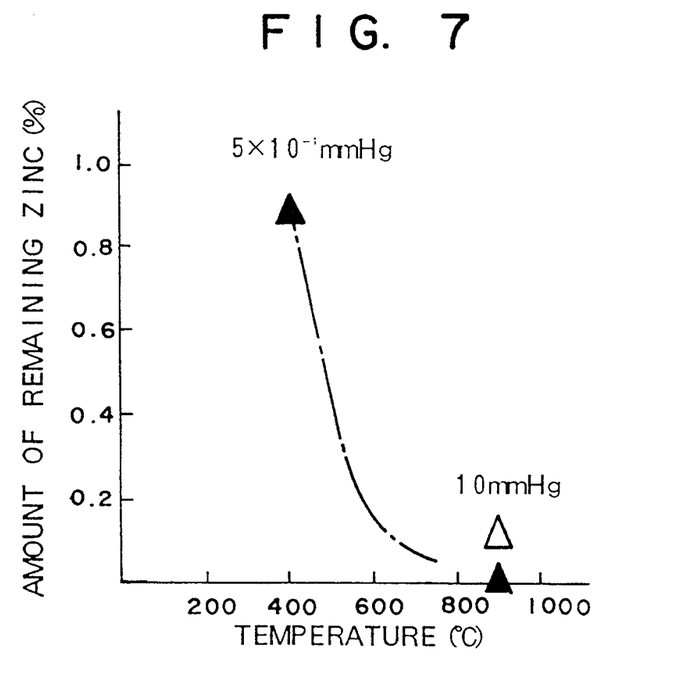
FIG. 7 is a graphical representation illustrating another remaining zinc amount versus temperature characteristic in accordance with the first embodiment of the present invention.

Galvanized steel sheets were heated to 400° C.-900° C. under the pressure conditions of $5 \times 10^{-1}$ mmHg and 10 mmHg, and the results are shown in FIG. 7.

As seen from FIG. 7, under $5 \times 10^{-1}$ mmHg, the amount of remaining zinc in the case of 400° C. was 0.86 weight % and that in the case of 900° C. was 0.002%. This demonstrates that a large removal effect is seen with the method in accordance with the present invention. Further, when the steel sheets were heated to 900° C. under 10 mmHg, the amount of remaining zinc was 0.092 weight %. This demonstrates that an excellent zinc removal effect can be seen without being largely affected by the magnitude of the reduced pressure.

TEST 4

Galvanized steel sheets were heated to 600° C.-900° C. under $5 \times 10^{-1}$ mmHg and the holding time period was varied so as to investigate how the holding period affects zinc removal. The results are shown in FIG. 8.

Figure 8:
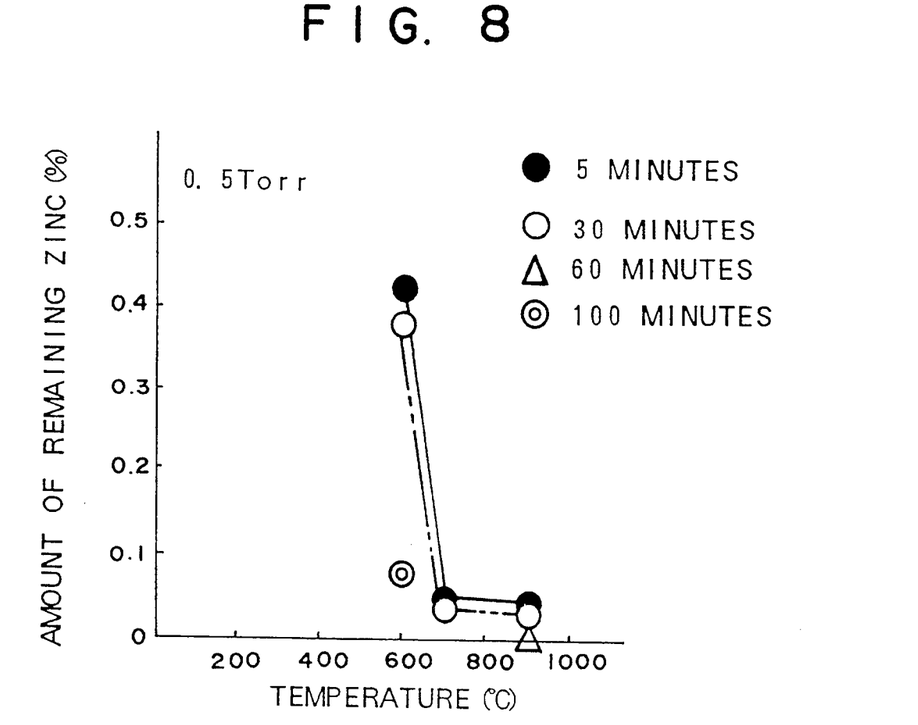
FIG. 8 is a graphical representation illustrating another remaining zinc amount versus temperature characteristic in accordance with the first embodiment of the present invention.

As can be seen in FIG. 8, at 660° C. the larger the time period, the more zinc was removed from the scraps. In contrast, at 700° C. and 900° C., zinc was almost perfectly removed from the scraps even in a smaller time period. Furthermore, at 600° C., when the holding periods were five and thirty minutes, the amount of zinc remaining on the scraps was about 0.4 weight %. In contrast, at 700° C. and 900° C. when the holding time periods was five minutes and thirty minutes, the amount of zinc remaining was less than 0.05 weight %. A similar zinc removal was seen in the case of 900° C.

In accordance with the invention, since the scraps are heated to about 200° C.-500° C. to evaporate the organic material adhering to the scraps and then the scraps are heated to 500° C.-900° C. to evaporate the plated metal, reaction between the organic material and the plated metal is prevented, and the plated metal can be smoothly evaporated.

Figure 9:
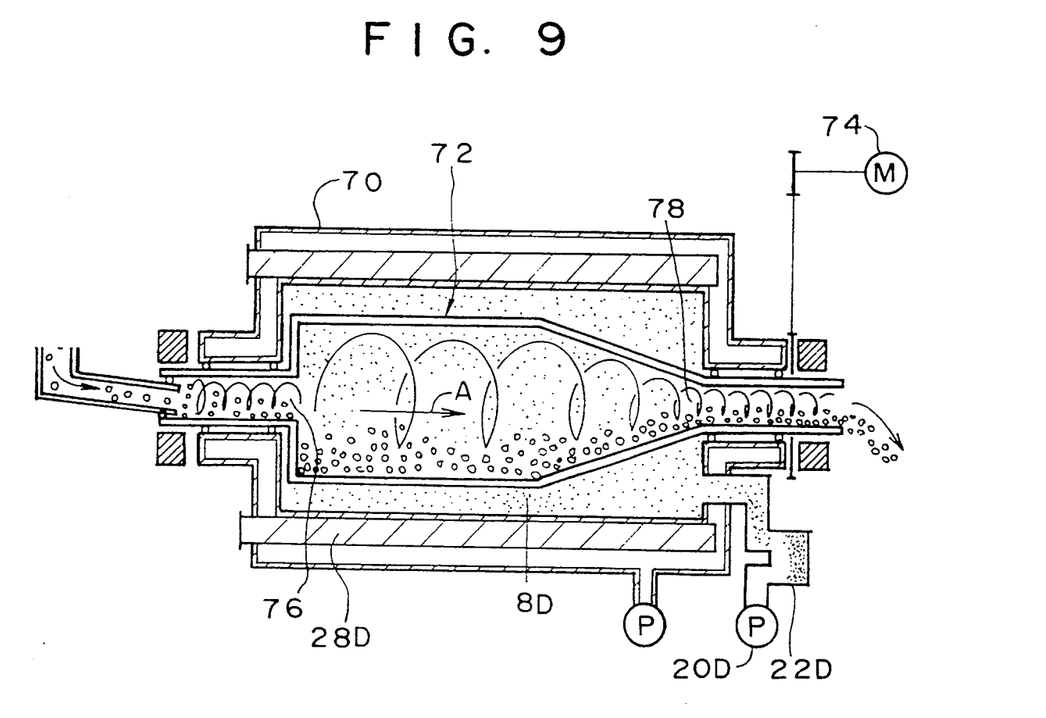
FIG. 9 is a cross-sectional view of a treatment chamber of an apparatus for removing plated metal from steel sheet scraps in accordance with a second embodiment of the present invention.
Figure 10:
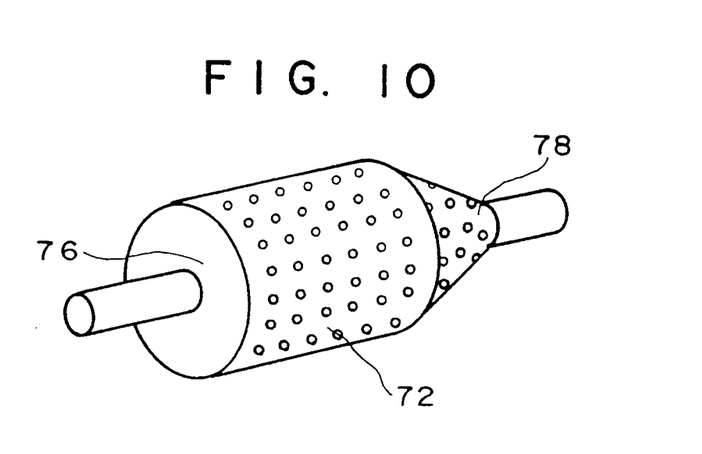
FIG. 10 is an oblique view of a drum to be installed in the treatment chamber of the apparatus of FIG. 9.
Figure 11:
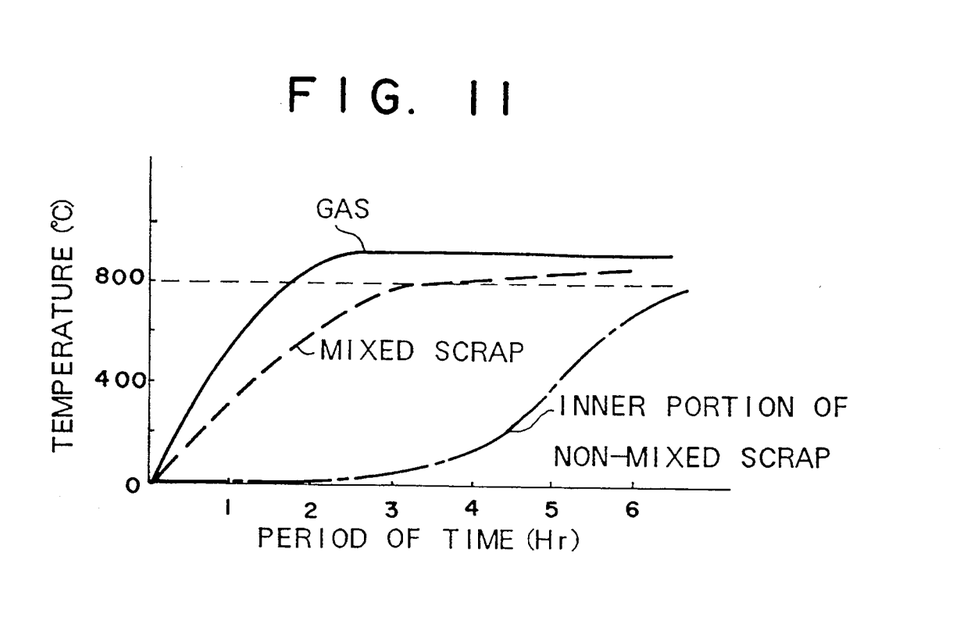
FIG. 11 is a graphical representation of temperature versus heating time period characteristics in a case where straps are mixed and in a case where scraps are conveyed on a pallet without being mixed.

The second embodiment, which is illustrated in FIGS. 9-11, relates to an improvement of the first embodiment of the present invention and, more particularly, relates to an apparatus wherein metal plated steel sheet scraps (for example, galvanized steel sheet scraps) can be evenly heated in a shorter time period than in the first embodiment.

In the first embodiment, since the scraps are conveyed through the treatment chamber in a pile, the inner portion of the piled scraps cannot be heated as quickly as the outer portion of the piled scraps. As a result, a relatively long period of time is required for zinc removal.

In order to shorten the zinc removal period of time, as illustrated in FIG. 9, a treatment chamber 8D in accordance with the second embodiment of the invention includes a fixed, cylindrical outer wall 70, a drum 72 disposed within and rotatably supported by the outer wall 72, and a drive device 74 for rotating the drum 72. As shown more clearly in FIG. 10, the drum 72 has a plurality of small holes through which the inside and the outside of the drum 72 communicate with each other. The drum 72 has a spiral guide plate fixed to an inside surface of the drum 72 so that scraps supplied into the interior of the drum 72 are conveyed from the inlet 76 toward the outlet 78 of the drum 72, guided by the spiral guide plate, when the drum 72 is rotated.

A heater 28D is supported by the fixed outer wall 70. The interior of the outer wall 70 is reduced in pressure by a pressure reducing pump 20D which is connected to the treatment chamber 8D via a passage. Evaporated metal is retrieved by a retrieving device 22D which is installed in the passage connecting the treatment chamber 8D to the pressure reducing pump 20D. Since the remaining structures are the same as those of the first embodiment, they are denoted by the same reference numerals and further explanation is unnecessary.

Figure 12:
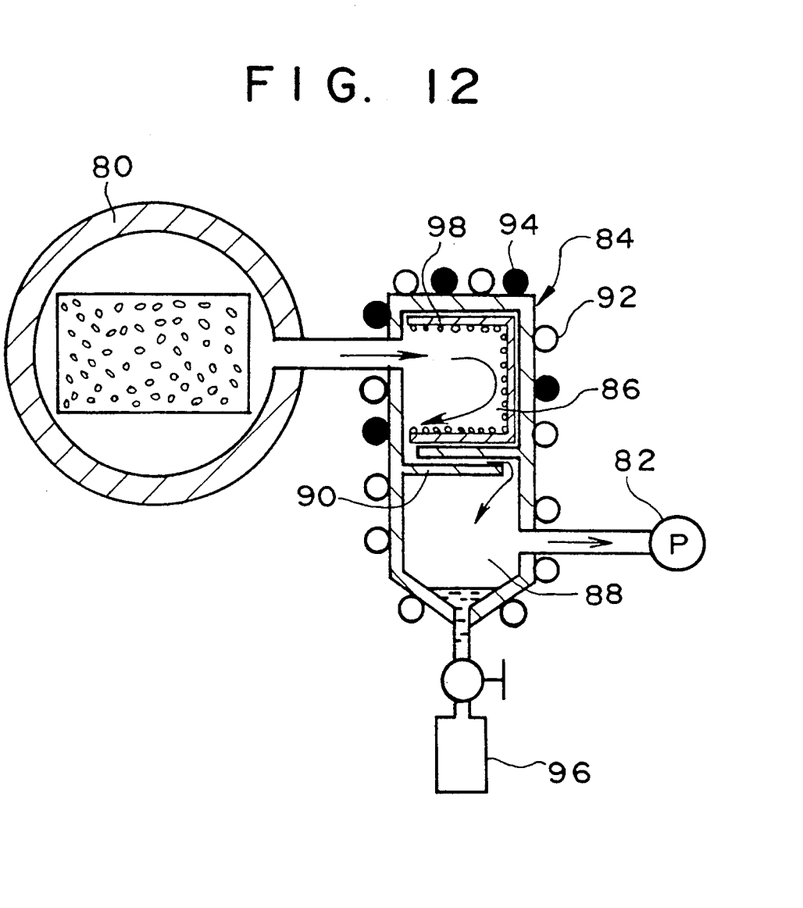
FIG. 12 is a cross-sectional view of a furnace and a retrieving device of an apparatus for removing plated metal from steel sheet scraps in accordance with a third embodiment of the present invention.
Figure 13:
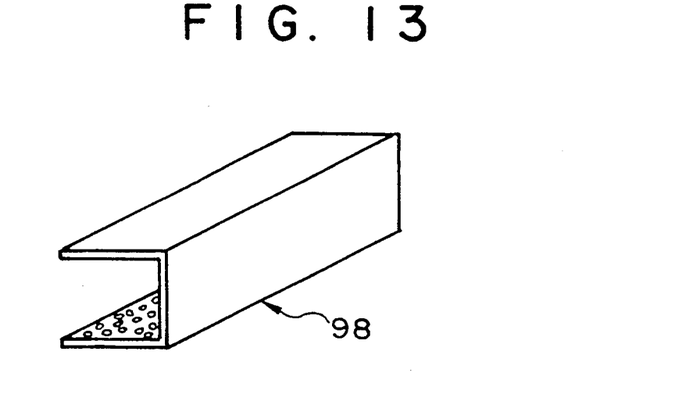
FIG. 13 is an oblique view of a metal collecting member to be inserted into the retrieving device of the apparatus of FIG. 12.

The third embodiment, which is illustrated in FIGS. 12 and 13, relates to a modification of the first embodiment. In the third embodiment, for the purpose of making the apparatus compact, the pretreatment chamber and the treatment chamber are integrated to a single furnace 80 for heating scraps to evaporate both organic material adhering to the scraps and plated metal.

A single pressure reducing pump 82 is connected the single furnace 80 via a passage, and a single retrieving device 84 is installed in the passage connecting the furnace 80 to the pressure reducing pump 82. A plurality condensing chambers 86 and 88 which communicate with each other are formed within the retrieving device 84 by dividing the interior of the retrieving device with a partition 90.

A heater 92 and a cooler 94 are installed at a wall of the retrieving device 84 so that the condensing chambers 86 and 88 are maintained different temperatures. More particularly, the upstream chamber 86 is controlled to the boiling point of the plated metal, for example zinc, and the downstream chamber 88 is controlled to the boiling point of the organic material adhering to the scraps. If a plurality of kinds of plated metal and organic material are contained in the scraps, the number of the condensing chambers may be increased as necessary. Beneath the chamber 88 which is controlled to the boiling point of the organic material, a collector 96 for collecting liquid organic material is installed so as to communicate with the chamber 88.

When the scraps are heated in the furnace 80, the organic material having a relatively low boiling point is evaporated first. When the scraps are heated to a higher temperature, the plated metal having a relatively high boiling point is evaporated. The evaporated organic material flows through the chamber 86 which is maintained at the boiling point of the plated metal to the chamber 88 maintained at the boiling point of the organic material, where the evaporated organic material is condensed to liquid organic material which is collected in the collector 96.

After all the organic material is removed from the scraps, the scraps are heated to a higher temperature so that the plated metal is evaporated without reacting with the organic material. The evaporated metal flows to the chamber 86 maintained at the boiling point of the plated metal, where the evaporated metal is condensed via liquid metal to solid metal. In order to easily collect the condensed metal, a metal collecting member 98 is inserted into the condensing chamber 86, and after the metal condenses on a surface of the member 98, the member 98 is taken out from the chamber 86.

accordance with the third embodiment, since the pretreatment chamber and the treatment chamber of the first embodiment are integrated into a single furnace 80, the apparatus of the third embodiment is more compact that that of the first embodiment.

Figure 14:
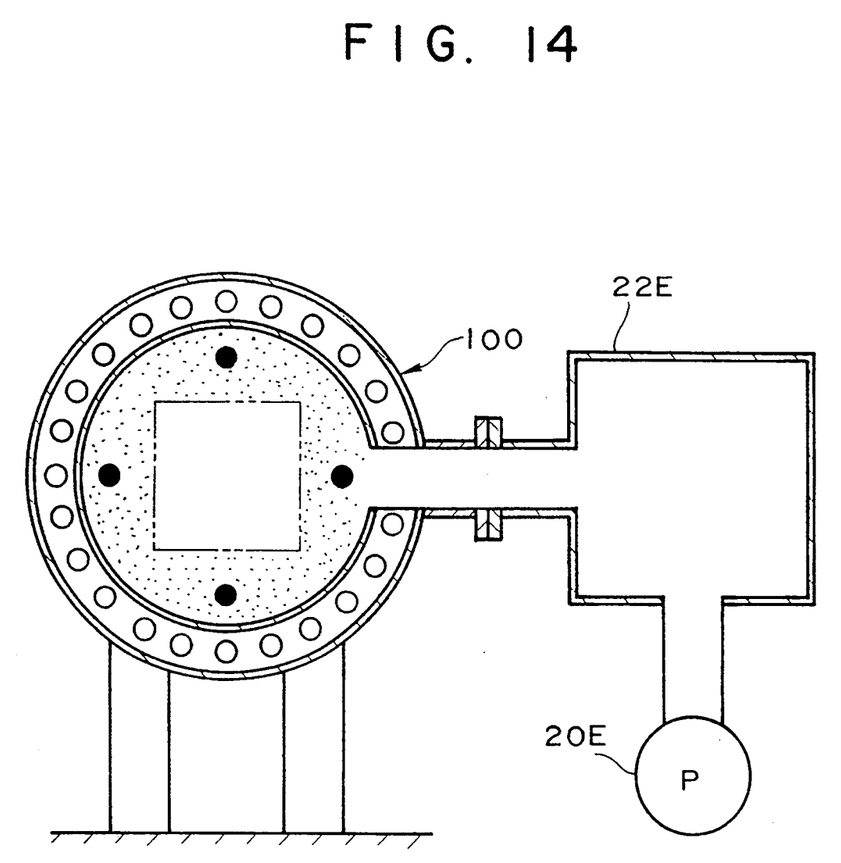
FIG. 14 is a cross-sectional view of an apparatus for removing plated metal from steel sheet scraps in accordance with a fourth embodiment of the present invention.
Figure 15:
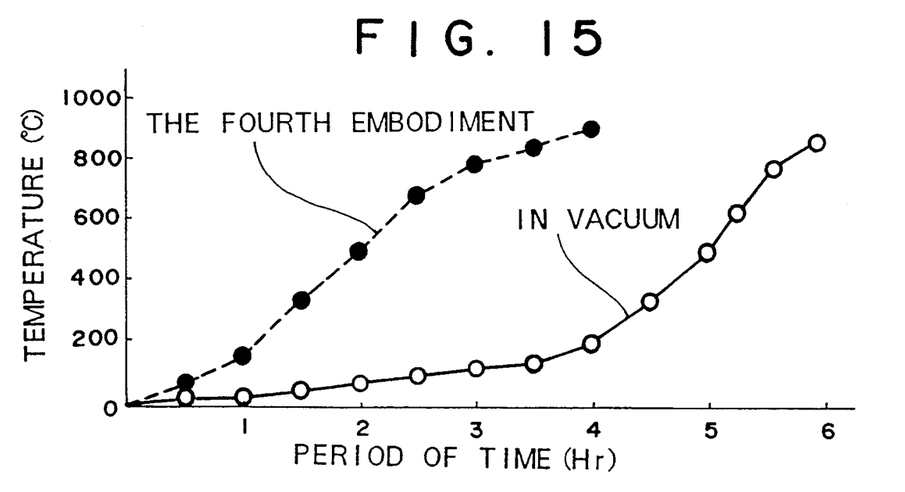
FIG. 15 is a graphical representation of a temperature versus elapsed time characteristic in heating scraps using the apparatus of FIG. 14.

The fourth embodiment, which is illustrated in FIGS. 14 and 15, relates to another modification of the first embodiment of the invention, wherein metal plated steel sheet scraps (for example, galvanized steel sheet scraps) can be heated in a shorter period of time than in the first embodiment.

In the method for removing plated metal from metal plated steel sheet scraps (for example, galvanized steel sheet scraps) in accordance with the fourth embodiment of the present invention, as illustrated in FIG. 14, scraps from which organic material has been removed are placed in a furnace 100 as a treatment chamber filled with non-oxidizing gas, such as nitrogen gas, of a pressure equal to or close to atmospheric pressure, and are heated to a temperature close to 500° C., for example to a temperature in the range about 400° C.–650° C. Then, the furnace 100 is reduced in pressure by operating a pressure reducing pump 20E which is connected to the furnace 100 via a passage, so that plated metal evaporates from the galvanized scraps. The evaporated metal flows to a retrieving device 22E which is installed in the passage connecting the furnace 100 to the pressure reducing pump 20E. The evaporated metal is condensed in the retrieving device 22E and is collected.

Since the scraps are heated with a gas of a pressure equal to or close to atmospheric pressure, the filled gas effectively transmits heat from the heater to the scraps through convection As a result as illustrated in FIG. 15, the temperature of the scraps can be raised in a shorter period of time than in the case of heating in a reduced pressure. Furthermore, since the filled gas is non-oxidizing gas, oxidation of steel sheets is prevented.

In the fourth embodiment, heating in a non-oxidizing gas may be replaced by directly heating with the flame of a reduction burner at atmospheric pressure. Since the scraps are heated in a reduction condition including CO gas, oxidation of steel sheet scraps is effectively prevented. With respect to the remaining CO gas which has not been burned during direct heating, the remaining CO gas is secondarily burned, the energy of which is used for heating fresh air. The heated fresh air is circulated to a panel heater of the chamber which is reduced in pressure after direct heating of the scraps and further is used as fresh air for the reduction burner. As a result, the energy of the secondary burning is effectively utilized.

in the case of heating by the reduction burner, since the scraps are directly heated by flame and heated at atmospheric pressure, the temperature of the scraps can be raised in a relatively short period of time through convection and heat conduction.

Although only certain embodiments of the invention have been described in detail above, it will be appreciated by those skilled in the art that various modifications and alterations can be made to the particular embodiment shown without materially departing from the novel teachings and advantages of the present invention. Accordingly, it is to be understood that all such modifications and alterations are included within the spirit and scope of the present invention as defined by the following claims.

What is claimed is:

1. A method for removing plated metal from steel sheet scraps comprising the steps of:
   preheating metal plated steel sheet scraps in a preheat chamber;

heating the preheated scraps to a temperature in a range of about 200° C.–500° C. under reduced pressure in a pretreatment chamber to evaporate organic material adhered to the scraps and contained in the scraps;

capturing the evaporated organic material;

conveying the scraps through an intermediate chamber into a treatment chamber;

heating the scraps to a temperature in a range of about 500° C.–950° C. and reducing a pressure in the treatment chamber to evaporate plated metal from the scraps;

retrieving the evaporated metal; and cooling the scraps with gas in a cooling chamber.

2. A method according to claim 1, wherein the plated metal is zinc.

3. A method according to claim 1, wherein the plated metal is aluminum.

4. A method according to claim 1, wherein said cooling gas used for cooling the scraps is circulated from the cooling chamber to the preheat chamber so that thermal energy retrieved from heated scraps is used for preheating further scraps.

5. A method according to claim 1, wherein a reduced pressure in the pretreatment chamber is generated by a pressure reducing pump connected to the pretreatment chamber via a passage and wherein the evaporated organic material is captured by a filter disposed in the passage connecting the pretreatment chamber to the pressure reducing pump.

6. A method according to claim 1, wherein a reduced pressure in the treatment chamber is generated by a pressure reducing pump connected to the treatment chamber via a passage and wherein the evaporated metal is retrieved by a retrieving device disposed in the passage connecting the treatment chamber to the pressure reducing pump.

7. A method according to claim 6, wherein the evaporated metal is condensed on an inside surface of the retrieving device which is cooled with cooling water, and condensed metal is cut from the cooled inside surface of the retrieving device with a cutter and is collected.

8. A method according to claim 6, wherein the evaporated metal is condensed and retrieved with a cooled filter disposed within the retrieving device.

9. A method according to claim 6, wherein the evaporated metal is brought into contact a rotating rapid cooling member to be condensed in the form of amorphous and thereafter collected.

10. A method according to claim 1, wherein a reduced pressure generated in the pretreatment chamber is in a range of about $10^{-4}$–$10^{-1}$ mmHg.

11. A method according to claim 1, wherein a reduced pressure generated in the treatment chamber is in a range of about $10^{-4}$–$10^{-1}$ mmHg.

12. A method according to claim 1, wherein said preheating metal plated steel sheet scraps is conducted in air.

13. A method according to claim 1, wherein said preheating metal plated steel sheet scraps is conducted in a non-oxidizing gas environment.

14. A method according to claim 1, wherein the gas with which said cooling the scraps in the cooling chamber is conducted is air.

15. A method according to claim 1, wherein the gas with which said cooling the scraps is conducted in the cooling chamber is non-oxidizing gas.

16. An apparatus for removing plated metal from steel sheet scraps comprising:

a pretreatment chamber having heating means for heating metal plated steel sheet scraps to a temperature in a range of about 200° C.–500° C. to evaporate organic material adhered to the scraps and contained in the scraps, a pressure reducing pump being connected to the pretreatment chamber via a passage, and a filter for capturing the evaporated organic material being installed in the passage connecting the pretreatment chamber to the pressure reducing pump;

a treatment chamber having a heater for heating the scraps from which organic material has been removed to a temperature in a range of about 500° C.–900° C., a pressure reducing pump being connected to the treatment chamber via a passage, and an evaporated metal retrieving device being installed in the passage connecting the treatment chamber to the pressure reducing pump; and a cooling chamber for cooling the scraps.

17. An apparatus for removing plated metal from steel sheet scraps comprising:

a preheat chamber for preheating metal plated steel sheet scraps;

a pretreatment chamber having heating means for heating the preheated scraps to a temperature in a range of about 200° C.–500° C. to evaporate organic material adhered to the scraps and contained in the scraps, a pressure reducing pump for reducing a pressure in the pretreatment chamber being connected to the pretreatment chamber via a passage, and a filter for capturing the evaporated organic material being installed in the passage connecting the pretreatment chamber to the pressure reducing pump;

an intermediate chamber through which the scraps from the pretreatment chamber is conveyed;

a treatment chamber having a heater for heating the scraps from which organic material has been removed to a temperature in a range of about 500° C.–900° C., a pressure reducing pump for reducing a pressure in the treatment chamber being connected to the treatment chamber via a passage, and an evaporated metal retrieving device being installed in the passage connecting the treatment chamber and the pressure reducing pump; and a cooling chamber for cooling the scraps.

18. An apparatus according to claim 16, wherein the treatment chamber includes:

an outer wall;

a drum disposed within and rotatably supported by the outer wall, the drum having a plurality of holes therethrough through which an interior and an exterior of the drum are in communication, the scraps being conveyed through the drum; and drive means for rotating the drum.

19. An apparatus according to claim 18, wherein the heating means provided for the treatment chamber is installed to the outer wall of the treatment chamber.

20. An apparatus for removing plated metal from steel sheet scraps comprising:

a furnace for heating metal plated steel sheet scraps to evaporate plated metal and organic metal adhering to and contained in the scraps; and a retrieving chamber, connected to the furnace, for retrieving a plurality kinds of evaporated material, the retrieving chamber including a plurality of condensing chambers which are respectively controlled in temperature to respective boiling points of the plurality kinds material, the condensing chambers being in communication with each other and being arranged in series so that each condensing chamber is disposed upstream of any condensing chamber for condensing a material having a lower boiling point and downstream of any condensing chamber for condensing a material having a higher boiling point than the material it is adapted to condense.

21. An apparatus according to claim 20, wherein the furnace is connected to a pressure reducing pump via a passage, and the retrieving chamber is installed in the passage connecting the furnace to the pressure reducing pump.

* * * * *